US012294165B2

(12) United States Patent
Bao et al.

(10) Patent No.: US 12,294,165 B2
(45) Date of Patent: May 6, 2025

(54) ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Sihui Bao, Beijing (CN); Chunnan Feng, Beijing (CN); Yunnan Jin, Beijing (CN); Zhifeng Zhang, Beijing (CN); Guohui Nan, Beijing (CN); Liang Guo, Beijing (CN); Haoyang Zhang, Beijing (CN); Zhe Chen, Beijing (CN); Shuo Yang, Beijing (CN); Zheng Chen, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,965

(22) PCT Filed: May 13, 2022

(86) PCT No.: PCT/CN2022/092630
§ 371 (c)(1),
(2) Date: Feb. 17, 2023

(87) PCT Pub. No.: WO2023/216217
PCT Pub. Date: Nov. 16, 2023

(65) Prior Publication Data

US 2024/0275054 A1 Aug. 15, 2024

(51) Int. Cl.
*H01Q 21/00* (2006.01)
*H01Q 1/22* (2006.01)
*H01Q 9/04* (2006.01)

(52) U.S. Cl.
CPC ............ *H01Q 9/0414* (2013.01); *H01Q 1/22* (2013.01)

(58) Field of Classification Search
CPC .......... H01Q 9/0414; H01Q 1/22; H01Q 1/36; H01Q 1/38; H01Q 1/50; H01Q 1/52; H01Q 21/24; H01Q 21/00
See application file for complete search history.

(56) References Cited

U.S. PATENT DOCUMENTS

2019/0058264 A1 2/2019 Jung et al.
2023/0084643 A1* 3/2023 Wang ...................... H01Q 1/38 343/702

FOREIGN PATENT DOCUMENTS

CN 107342458 A 11/2017
CN 107453044 A 12/2017
(Continued)

*Primary Examiner* — David E Lotter
(74) *Attorney, Agent, or Firm* — Nath, Goldberg & Meyer; Joshua B. Goldberg

(57) ABSTRACT

An antenna is provided, and belongs to the field of communication technology and includes a first dielectric substrate, a first conductive layer, a second dielectric substrate, a second conductive layer, a third dielectric substrate and a conductive third layer which are sequentially stacked. The first conductive layer includes at least one first and second feed lines; the second conductive layer is provided with at least one first and second openings; the third conductive layer includes at least one first radiation part. Orthographic projections of any two of a first opening, a first feed line, a first radiation part corresponding to each on the other first dielectric substrate overlap with other; each an orthographic projection of a first radiation part on the first dielectric substrate intersects with that of each of a corresponding first and second feed lines on the first dielectric substrate.

16 Claims, 12 Drawing Sheets

(56) References Cited

FOREIGN PATENT DOCUMENTS

| | | | |
|---|---|---|---|
| CN | 110137672 | A | 8/2019 |
| CN | 110797649 | A | 2/2020 |
| CN | 113161720 | A | 7/2021 |
| CN | 114447577 | A | 5/2022 |
| JP | 2003078338 | A | 3/2003 |
| WO | 9608055 | A1 | 3/1996 |

* cited by examiner

ANTENNA AND ELECTRONIC DEVICE

This is a National Phase Application filed under 35 U.S.C. 371 as a national stage of PCT/CN2022/092630, filed May 13, 2022, the entire contents of which is incorporated herein by reference.

TECHNICAL FIELD

The present disclosure relates to the field of communication technology, and in particular to an antenna and an electronic device.

BACKGROUND

As the number of 5G base stations is sharply increasing, there is no doubt that the aesthetics of the environment is influenced to a great extent due to the over-dense layout of the 5G base stations. Therefore, a base station antenna with transparent and aesthetic property becomes a new scheme. Miniaturization is one of key requirements for an antenna design; and how to simultaneously solve the problems of transparency and a low profile of an antenna is nowadays a major trend and subject for an antenna side of the 5G base station.

SUMMARY

The present disclosure is directed to at least one of the technical problems of the prior art, and provides an antenna and an electronic device.

In a first aspect, an embodiment of the present disclosure provides an antenna, including a first dielectric substrate, a first conductive layer, a second dielectric substrate, a second conductive layer, a third dielectric substrate and a third conductive layer which are sequentially stacked; the first conductive layer includes at least one first feed line and at least one second feed line; the second conductive layer is provided with at least one first opening and at least one second opening therein; and the third conductive layer includes at least one first radiation part; orthographic projections of any two of a first opening, a first feed line, a first radiation part corresponding to each other on the first dielectric substrate overlap with each other; and orthographic projections of any two of a second opening, a second feed line, a first radiation part corresponding to each other on the first dielectric substrate overlap with each other; and an outline of an orthographic projection of a first radiation part on the first dielectric substrate intersects with an orthographic projection of each of a corresponding first feed line and a corresponding second feed line on the first dielectric substrate, and the orthographic projection of each of the first feed line and the second feed line on the first dielectric substrate extends into the orthographic projection of the first radiation part on the first dielectric substrate; and the at least one first feed line and the at least one second feed line have different extending directions.

In some embodiments, each of the at least one first opening and the at least one second opening has two types of slits orthogonal to each other.

In some embodiments, each of the at least one first opening and the at least one second opening includes an H-shaped opening.

In some embodiments, each first feed line includes a first feed line sub-segment and a second feed line sub-segment connected in a T shape; and each second feed line includes a third feed line sub-segment and a fourth feed line sub-segment connected in the T shape.

In some embodiments, each first feed line further includes a first branch, each second feed line also includes a second branch; the first branch is connected to one end of a corresponding first feed line sub-segment, and an extending direction of the first branch intersects with an extending direction of the first feed line sub-segment; an extending direction of the second branch intersects with an extending direction of a corresponding third feed line sub-segment; and orthographic projections of the first branch and the second branch on the first dielectric substrate are both covered by the orthographic projection of a corresponding first radiation part on the first dielectric substrate.

In some embodiments, the antenna is divided into at least one radiation unit, each radiation unit includes one first radiation part, one first feed line, and one second feed line; and each of the first feed line sub-segment and the third feed line sub-segment includes a first end and a second end opposite to each other; and in one radiation unit, the first end of the first feed line sub-segment is adjacent to the first end of the third feed line sub-segment; the first branch is connected to the first end of the first feed line sub-segment; and the second branch is connected to the first end of the third feed line sub-segment.

In some embodiments, in one radiation unit, an extension line of the second feed line sub-segment and an extension line of the fourth feed line sub-segment intersect with each other to form a first angle, which is bisected by a first dividing line; and the first feed line and the second feed line are arranged in mirror symmetry with respect to an extension line of the first dividing line as a symmetry axis.

In some embodiments, the antenna is divided into at least one radiation unit, each radiation unit includes one first radiation part, one first feed line, and one second feed line; and the second conductive layer further includes at least one third opening; and an orthographic projection of one third opening on the first dielectric substrate is between orthographic projections of a first feed line and a second feed line of a corresponding radiation unit on the first dielectric substrate, and at least partially overlaps with an orthographic projection of the first radiation part on the first dielectric substrate In some embodiments, the first dielectric substrate includes a first side and a second side opposite to each other; the antenna further includes a first feed substrate and a second feed substrate; the first feed substrate includes a fourth dielectric substrate, a first feed structure and a first reference electrode layer; the fourth dielectric substrate is opposite to the first side; the first feed structure is on a side of the fourth dielectric substrate close to the first side, and is electrically connected to the at least one first feed line; and the first reference electrode layer is on a side of the fourth dielectric substrate away from the first feed structure; and the second feed substrate includes a fifth dielectric substrate, a second feed structure and a second reference electrode layer; the fifth dielectric substrate is opposite to the second side; the second feed structure is on a side of the fifth dielectric substrate close to the second side and is electrically connected to the at least one second feed line; and the second reference electrode layer is on a side of the fifth dielectric substrate away from the second feed structure.

In some embodiments, the antenna further includes a reflective layer on a side of the first dielectric substrate away from the first conductive layer.

In some embodiments, the reflective layer includes a metal mesh structure.

In some embodiments, the antenna further includes a sixth dielectric substrate, and at least one second radiation part on the sixth dielectric substrate; an orthographic projection of a second radiation part on the first dielectric substrate at least partially overlaps with an orthographic projection of a corresponding first radiation part on the first dielectric substrate; and a certain distance exists between a layer where the first radiation part is located and a layer where the second radiation part is located.

In some embodiments, each first radiation part includes a polygon, and any one of interior angles of the polygon is greater than 90°.

In some embodiments, the polygon includes a first side, a second side, a third side, a fourth side, a fifth side, a sixth side, a seventh side, and an eighth side connected in sequence; an extending direction of the first side is the same as that of the fifth side and perpendicular to that of the third side; orthographic projections of a first feed line and a second side corresponding to each other on the first dielectric substrate intersect with each other; and orthographic projections of a second feed line and a fourth side corresponding to each other on the first dielectric substrate intersect with each other.

In some embodiments, at least one of the first conductive layer, the second conductive layer, and the third conductive layer includes a metal mesh structure.

In a second aspect, an embodiment of the present disclosure provides an electronic device, which includes the antenna of any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
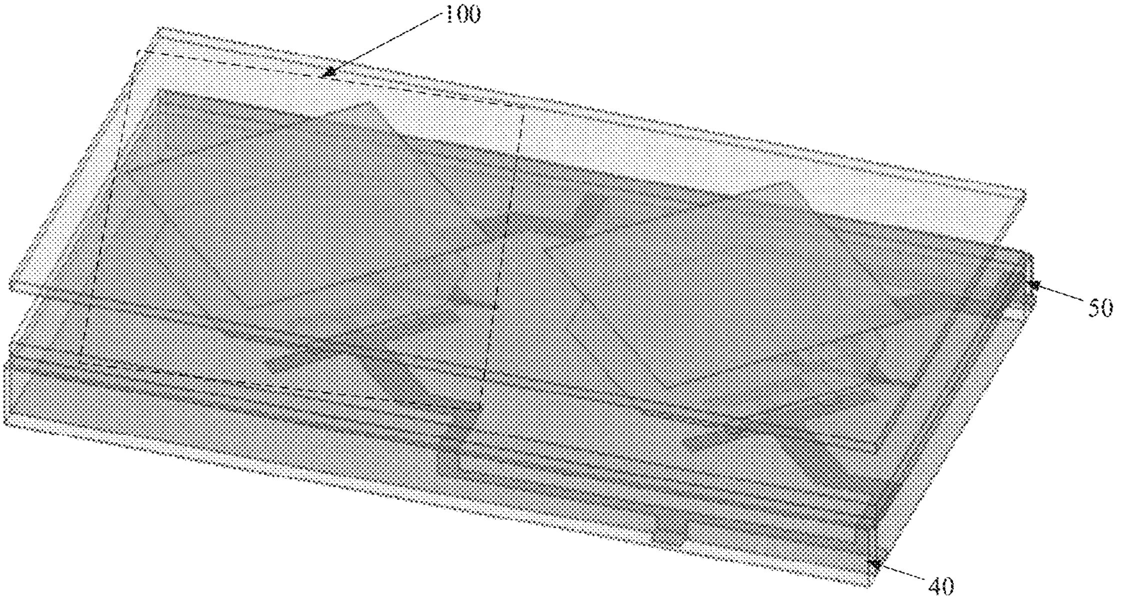
FIG. 1 is a schematic diagram of an antenna according to an embodiment of the present disclosure.
Figure 2:
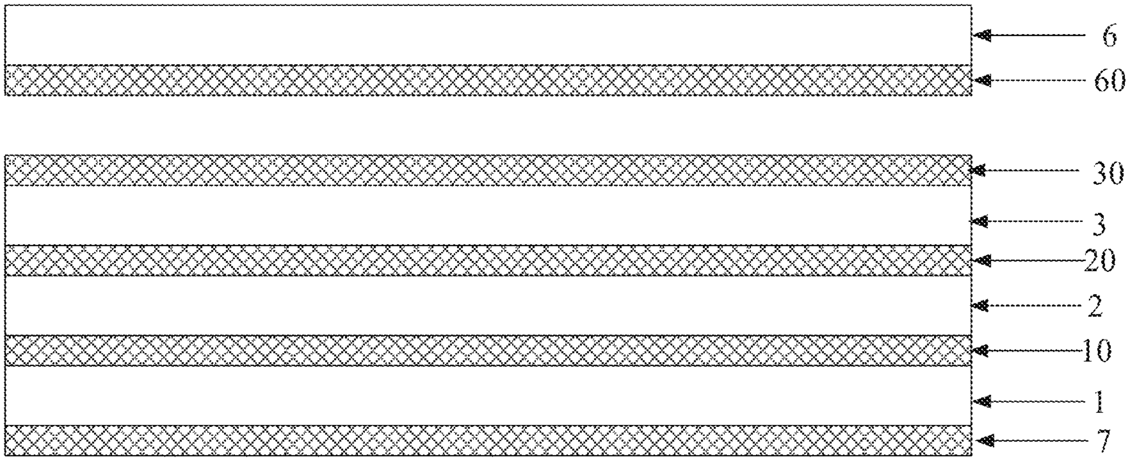
FIG. 2 is a cross-sectional view of an antenna according to an embodiment of the present disclosure.
Figure 3:
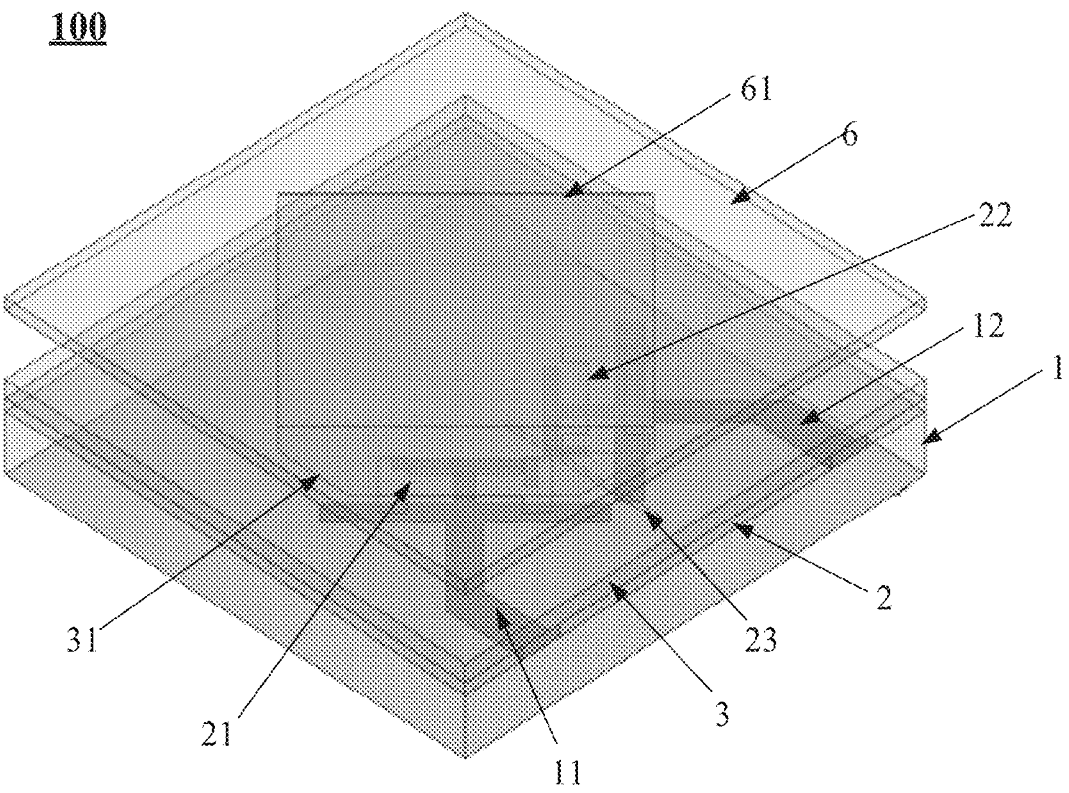
FIG. 3 is a schematic diagram of a radiation unit according to an embodiment of the present disclosure.
Figure 4:
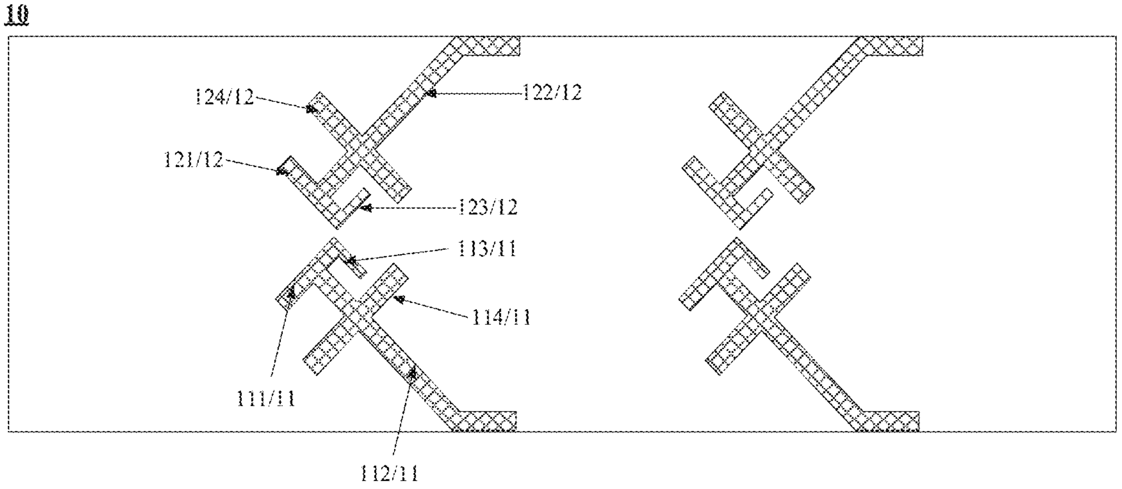
FIG. 4 is a top view of a first conductive layer according to an embodiment of the present disclosure.
Figure 5:
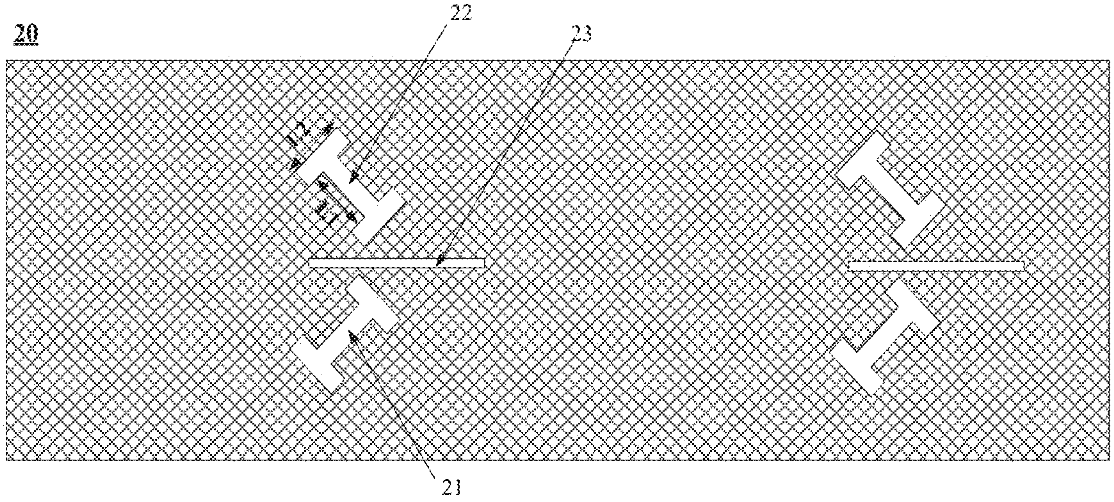
FIG. 5 is a top view of a second conductive layer according to an embodiment of the present disclosure.
Figure 6:
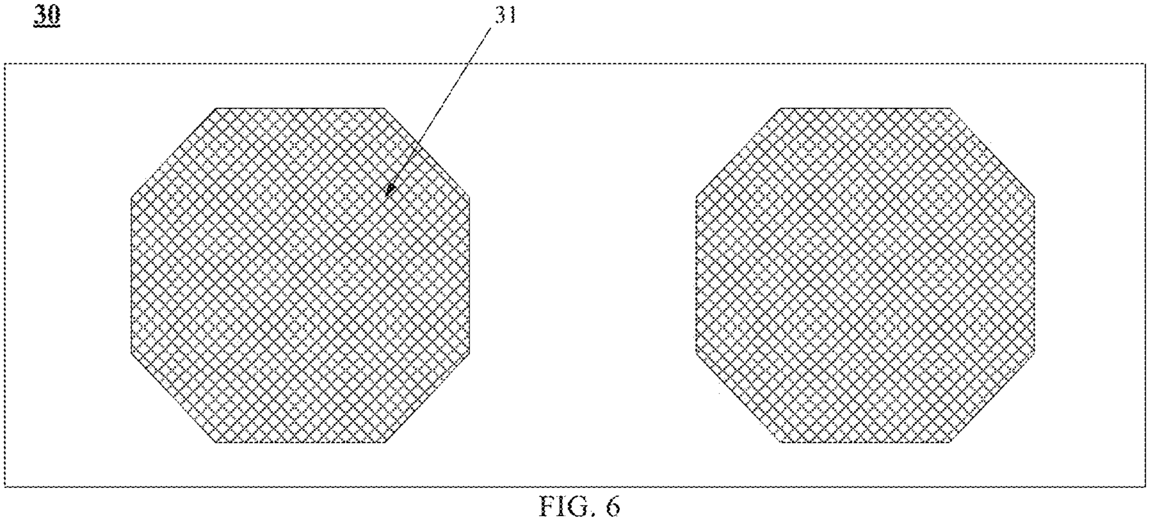
FIG. 6 is a top view of a third conductive layer according to an embodiment of the present disclosure.

In a first aspect, FIG. 1 is a schematic diagram of an antenna according to an embodiment of the present disclosure. FIG. 2 is a cross-sectional view of an antenna according to an embodiment of the present disclosure. FIG. 3 is a schematic diagram of a radiation unit 100 according to an embodiment of the present disclosure. FIG. 4 is a top view of a first conductive layer 10 according to an embodiment of the present disclosure. FIG. 5 is a top view of a second conductive layer 20 according to an embodiment of the present disclosure. FIG. 6 is a top view of a third conductive layer 30 according to an embodiment of the present disclosure. As shown in FIGS. 1 to 6, an embodiment of the present disclosure provides an antenna, which includes a first dielectric substrate 1, a first conductive layer 10, a second dielectric substrate 2, a second conductive layer 20, a third dielectric substrate 3, and a third conductive layer 30, which are sequentially stacked. The first conductive layer 10 includes at least one first feed line 11 and at least one second feed line 12. At least one first opening 21 and at least one second opening 22 are provided in the second conductive layer 20. The third conductive layer 30 includes at least one first radiation part 31.

In the antenna according to the embodiment of the present disclosure, orthographic projections of any two of a first opening 21, a first feed line 11, a first radiation part 31 corresponding to each other on the first dielectric substrate 1 overlap with each other; orthographic projections of any two of a second opening 22, a second feed line 12, a first radiation part 31 corresponding to each other on the first dielectric substrate 1 overlap with each other; an outline of an orthographic projection of a first radiation part 31 on the first dielectric substrate 1 intersects with an orthographic projection of each of a corresponding first feed line 11 and a corresponding second feed line 12 on the first dielectric substrate 1, and the orthographic projection of each of the first feed line 11 and the second feed line 12 on the first dielectric substrate 1 extends into the orthographic projection of the first radiation part 31 on the first dielectric substrate 1; the at least one first feed line 11 and the at least one second feed line 12 have different extending directions, i.e., have different feed directions. For example: the at least one first radiation part 31, the at least one first opening 21, the at least one second opening 22, the at least one first feed line 11 and the at least one second feed line 12 are disposed in a one-to-one correspondence; a microwave signal radiated by a first radiation part 31 is coupled and fed by a corresponding first feed line 11 through a corresponding first opening 21, and by a corresponding second feed line 12 through a corresponding second opening 22. The at least one first feed line 11 and the at least one second feed line 12 have different feed directions. That is, the antenna according to the embodiment of the present disclosure is a dual-polarized antenna.

It should be noted that the second conductive layer 20 may be a ground electrode layer. That is, a potential written into the second conductive layer 20 is the ground potential. The at least one first feed line 11 and the at least one second feed line 12 have different feed directions. For example: a feed direction of one of a first feed line 11 and a second feed line 12 is a vertical direction, and the other is a horizontal direction. That is, the feed direction of the at least one first feed line 11 is a direction in which an input end for a first microwave signal (an end through which a first microwave signal is input) is excited and fed; the feed direction of the at least one second feed line 12 is a direction in which an input end for a second microwave signal (an end through which a second microwave signal is input) is excited and fed. It is understood that the horizontal direction and the vertical direction are in relative terms. That is, if the feed direction of the at least one first feed line 11 is the vertical direction, the feed direction of the at least one second feed line 12 is the horizontal direction, or if the feed direction of the at least one first feed line 11 is the horizontal direction, the feed direction of the at least one second feed line 12 is the vertical direction.

In some examples, as shown in FIGS. 1 and 3, the antenna may be divided into at least one radiation unit 100, each including one first radiation part 31, one first feed line 11, one second feed line 12, one first opening 21, and one second opening 22. In each radiation unit 100, the first feed line 11 is coupled to the first radiation part 31 through the first opening 21, and the second feed line 12 is coupled to the first radiation part 31 through the second opening 22. In the embodiment of the present disclosure, the antenna includes a plurality of radiation units 100 as an example. In FIG. 1, as an example, the antenna includes two radiation units 100. It should be understood that the antenna may include only one radiation unit 100.

Figure 7:
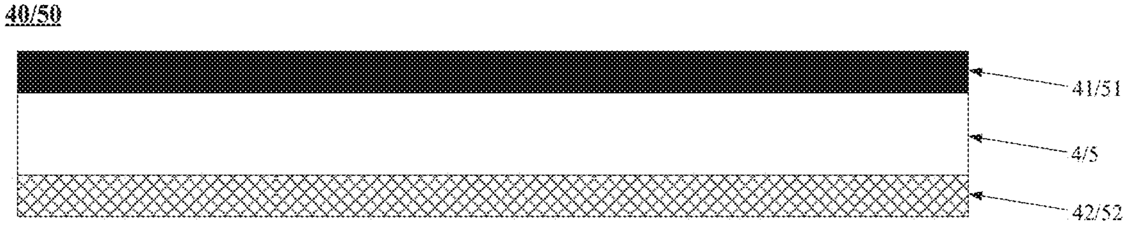
FIG. 7 is a cross-sectional view of a first feed substrate/a second feed substrate according to an embodiment of the present disclosure.
Figure 8:
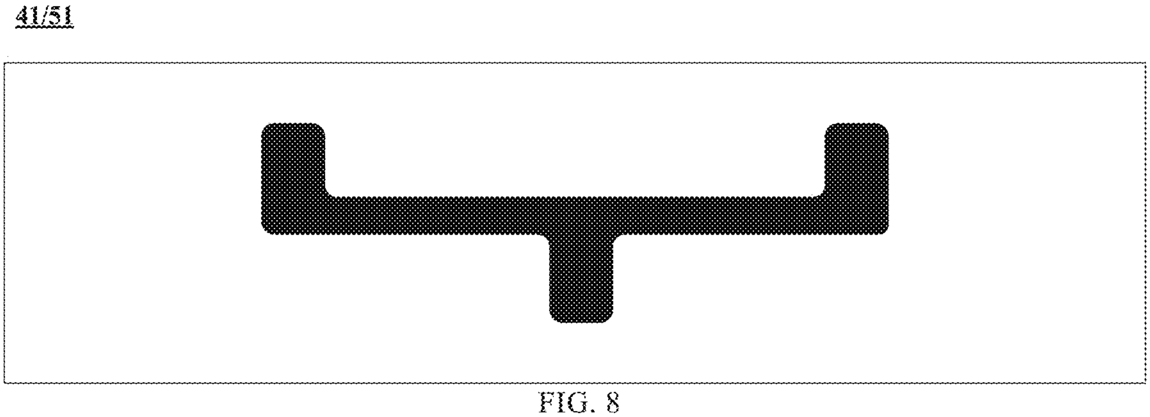
FIG. 8 is a top view of a first feed structure according to an embodiment of the present disclosure.

Further, FIG. 7 is a cross-sectional view of a first feed substrate 40/a second feed substrate 50 according to an embodiment of the present disclosure. FIG. 8 is a top view of a first feed structure 41 according to an embodiment of the present disclosure. As shown in FIGS. 7 and 8, in addition to the above structure, the antenna in the embodiment of the present disclosure further includes a first feed substrate 40 and a second feed substrate 50. The first feed substrate 40 is configured to feed the at least one first feed line 11, and the second feed substrate 50 is configured to feed the at least one second feed line 12. Specifically, the first feed substrate 40 includes a fourth dielectric substrate 4, a first feed structure 41, and a first reference electrode layer 42. The second feed substrate 50 includes a fifth dielectric substrate 5, a second feed structure 51, and a second reference electrode layer 52. The first dielectric substrate 1 includes a first side and a second side which are oppositely arranged; the fourth dielectric substrate 4 is disposed opposite to the first side of the first dielectric substrate 1; the first feed structure 41 is disposed on a side of the fourth dielectric substrate 4 close to the first side and electrically connected to the at least one first feed line 11; and the first reference electrode layer 42 is disposed on a side of the fourth dielectric substrate 4 away from the first feed structure 41. The fifth dielectric substrate 5 is disposed opposite to the second side of the first dielectric substrate 1; the second feed structure 51 is disposed on a side of the fifth dielectric substrate 5 close to the second side and is electrically connected to the at least one second feed line 12; and the second reference electrode layer 52 is disposed on a side of the fifth dielectric substrate 5 away from the second feed structure 51.

Further, the antenna illustrated in FIG. 1 includes two radiation units 100, that is, the antenna illustrated in FIG. 1 includes two first feed lines 11 and two second feed lines 12. In this case, the first feed structure 41 and the second feed structure 51 may both use a one-to-two power divider for feeding the two first feed lines 11 and the two second feed lines 12, respectively. Both the first reference electrode layer 42 and the second reference electrode layer 52 may be ground electrode layers. The fourth dielectric substrate 4 and the fifth dielectric substrate 5 may both adopt printed circuit boards (PCBs).

Further, in order to reduce power consumption, in the embodiment of the present disclosure, both the first feed structure 41 and the second feed structure 51 adopt a solid copper, which can effectively increase the antenna gain.

In some examples, in addition to the above structure, the antenna in the embodiment of the present disclosure further includes a reflective layer 7 disposed on a side of the first dielectric substrate 1 away from the first conductive layer 10, so that a microwave signal is emitted away from the first dielectric substrate 1, thereby realizing a design of a directional antenna.

Figure 9:
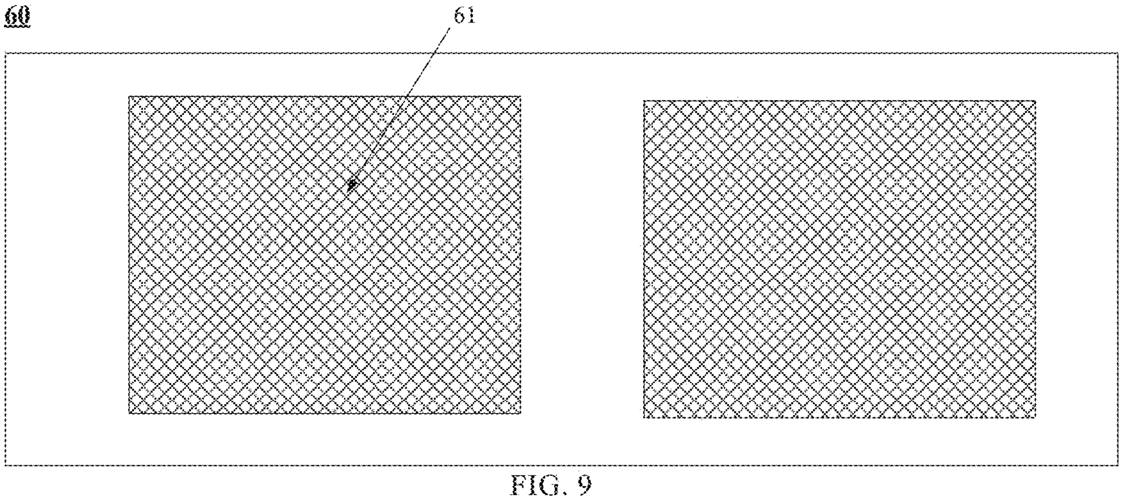
FIG. 9 is a top view of a fourth conductive layer according to an embodiment of the present disclosure.

In some examples, FIG. 9 is a top view of a fourth conductive layer 60 according to an embodiment of the present disclosure. As shown in FIGS. 1 and 9, in addition to the above structure, the antenna in the embodiment of the present disclosure further includes a sixth dielectric substrate 6 and a fourth conductive layer 60. The sixth dielectric substrate 6 is disposed opposite to the third conductive layer 30; the fourth conductive layer 60 is disposed on the sixth dielectric substrate 6, and includes at least one second radiation part 61; and an orthographic projection of a second radiation part 61 on the dielectric substrate overlaps with an orthographic projection of a corresponding first radiation part 31 on the dielectric substrate. For example; the at least one second radiation part 61 are in a one-to-one correspondence with the at least one first radiation part 31. That is, each radiation unit 100 further includes one second radiation part 61. In the embodiment of the present disclosure, the at least one second radiation part 61 is provided, so that the radiation area of each radiation unit 100 is increased, and the radiation efficiency is effectively improved. Further, the at least one second radiation part 61 is disposed on a side of the sixth dielectric substrate 6 close to the third conductive layer 30, so that a certain spacing exists between the at least one second radiation part 61 and the third conductive layer 30. With this arrangement, the sixth dielectric substrate 6 can serve as a protective layer for the at least one second radiation part 61, and the microwave signal radiated by the at least one first radiation part 31 can be directly coupled to a corresponding second radiation part 61 through the air dielectric layer, so that the transmission loss can be effectively reduced.

In some examples, with continued reference to FIG. 5, each of the at least one first opening 21 and the at least one second opening 22 in the second conductive layer 20 include at least two slits extending in two directions. In one example, each of the at least one first opening 21 and the at least one second opening 22 has two types of slits orthogonal to each other. For example; each of the at least one first opening 21 and the at least one second opening 22 is an H-shaped opening. In the embodiment of the present disclosure, each of the at least one first opening 21 and the at least one second opening 22 has two types of slits orthogonal to each other in order to widen the bandwidth of the antenna. In one example, each of the at least one first opening 21 and the at least one second opening 22 is an H-shaped opening, a length L1 of the "-" part of each H-shaped opening may be specifically set according to the bandwidth requirement of the actual product, for example, may be set to be 8 mm. A length L2 of each of the two "|" parts of each H-shaped opening may be specifically set according to the bandwidth requirement of the actual product, for example, may be set to be 6 mm.

Further, the second conductive layer 20 includes not only the at least one first opening 21 and the at least one second opening 22, but also at least one third opening 23. For example: each radiation unit 100 includes one third opening 23 located between the first opening 21 and the second opening 22. Alternatively, in each radiation unit 100, an orthographic projection of the third opening 23 on the first dielectric substrate 1 should be located between the orthographic projections of the first feed line 11 and the second feed line 12 on the first dielectric substrate 1, and at least partially overlaps with the orthographic projection of the first radiation part 31 on the first dielectric substrate 1. In this case, the port isolation of the first feed line 11 and the second feed line 12 for feeding the first radiation part 31 can be effectively improved by providing the third opening 23 in each radiation unit 100. Each third opening 23 includes, but is not limited to, a rectangular opening. In some examples, a width of each third opening 23 has a certain effect on the isolation of a corresponding first feed line 11 and a corresponding second feed line 12. The greater the width of each third opening 23 is, the better the port isolation is.

In some examples, with continued reference to FIG. 4, the at least one first feed line 11 and the at least one second feed line 12 employ T-shaped feed lines. It should be noted that the T shape includes a "-" part and a "|" part. The at least one first feed line 11 and the at least one second feed line 12 are required to extend to an edge of the first dielectric substrate 1 to be electrically connected to the first feed structure 41 and the second feed structure 51, respectively, so that a feed line segment of the "|" part of each of the T-shaped first feed line 11 and the T-shaped second feed line 12 is not necessarily straight, and may be a broken line segment for convenience of wiring. Specifically, each first feed line 11 includes a first feed line sub-segment 111 (the "-" part) and a second feed line sub-segment 112 (the "|" part) connected in the T shape; each second feed line 12 includes a third feed line sub-segment 121 (the "-" part) and a fourth feed line sub-segment 122 (the "|" part) connected in the T shape. It should be noted that each first feed line 11 and each second feed line 12 are provided with a first impedance matching section 114 and a second impedance matching section 124, respectively, so as to improve the cross polarization ratio and the radiation gain of each first feed line 11 and each second feed line 12, and reduce the transmission loss.

Further, in the embodiment of the present disclosure, each first feed line 11 includes not only the first feed line sub-segment 111 and the second feed line sub-segment 112, but also a first branch 113; accordingly, each second feed line 12 includes not only the third feed line sub-segment 121 and the fourth feed line sub-segment 122, but also a second branch 123. The first branch 113 is connected to one end of the first feed line sub-segment 111, and an extending direction of the first branch 113 intersects with an extending direction of the first feed line sub-segment 111; an extending direction of the second branch 123 intersects with an extending direction of the third feed line sub-segment 121; orthographic projections of the first branch 113 and the second branch 123 on the first dielectric substrate 1 are both covered by the orthographic projection of the first radiation part 31 on the first dielectric substrate 1. By adopting the first feed line 11 having the first branch 113, a current direction of the microwave signal transmitted by the first feed line 11 can be changed. Similarly, by adopting the second feed line 12 having the second branch 123, a current direction of the microwave signal transmitted by the second feed line 12 can be changed, so that the port isolation of the first feed line 11 and the second feed line 12 for feeding the first radiation part 31 can be effectively improved.

In one example, referring to FIG. 4, in each radiation unit 100, each of the first feed line sub-segment 111 of the first feed line 11 and the third feed line sub-segment 121 of the second feed line 12 includes a first end and a second end that are oppositely disposed, the first end of the first feed line sub-segment 111 is adjacent to the first end of the third feed line sub-segment 121, the first branch 113 is connected to the first end of the first feed line sub-segment 111, and the second branch 123 is connected to the first end of the third feed line sub-segment 121. That is, the first branch 113 and the second branch 123 are adjacent to each other. For example: the first branch 113 is electrically connected to the first feed line sub-segment 111 to form an L shape; the second branch 123 is electrically connected to the third feed line sub-segment 121 to form an L shape. When the current of the first feed line 11 is transmitted from the first feed line sub-segment 111 to the first branch 113, the transmission direction of the current is changed, as shown in the figure, from the horizontal direction to the downward direction. Similarly, when the current of the second feed line 12 is transmitted from the third feed line sub-segment 121 to the second branch 123, the transmission direction of the current is changed, as shown in the figure, from the horizontal direction to the downward direction. In this way, the port isolation of the first feed line 11 and the second feed line 12 for feeding the first radiation part 31 can be effectively improved. It should be noted that in FIG. 4, orientations of the first branch 113 and the second branch 123 are the same. Alternatively, the orientations of the first branch 113 and the second branch 123 may also be opposite to each other in an actual product.

Further, a length of each of the first branch 113 and the second branch 123 has a certain effect on the isolation of the first feed line 11 and the second feed line 12. The longer the length of each of the first branch 113 and the second branch 123 is, the better the port isolation is.

Further, for any radiation unit 100, an extension line of the second feed line sub-segment 112 of the first feed line 11 and an extension line of the fourth feed line sub-segment 122 of the second feed line 12 intersect with each other to form a first angle, which is bisected by a first dividing line; the first feed line 11 and the second feed line 12 are arranged in mirror symmetry with respect to an extension line of the first dividing line as a symmetry axis. It should be noted that in the embodiment of the present disclosure, the extension line of the second feed line sub-segment 112 refers to an extension line of a portion of the second feed line sub-segment 112 perpendicular to the first feed line sub-segment 111; the extension line of the fourth feed line sub-segment 122 refers to an extension line of a portion of the fourth feed line sub-segment 122 perpendicular to the third feed line sub-segment 121. In the embodiment of the present disclosure, the first feed line 11 and the second feed line 12 in each radiation unit 100 are arranged in mirror symmetry with respect to the first dividing line as the symmetry axis, so as to facilitate wiring and reduce transmission loss in the first feed line 11 and the second feed line 12.

Figure 10:
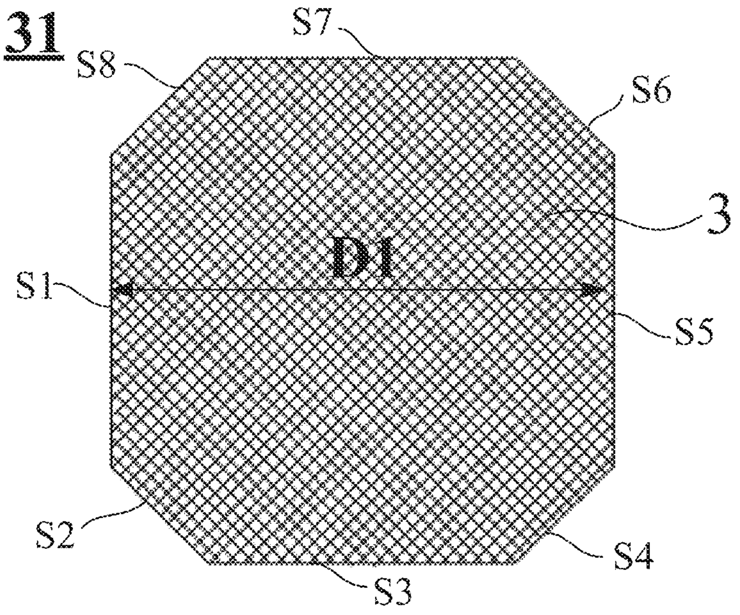
FIG. 10 is a top view of a first radiation part according to an embodiment of the present disclosure.

In some examples, an outline of each first radiation part 31 may be a polygon, a circle, an ellipse, a triangle, or the like. In one example, the outline of each first radiation part 31 is a polygon, and any one of internal angles of the polygon is greater than 90°. For example: FIG. 10 is a top view of a first radiation part 31 according to an embodiment of the present disclosure. As shown in FIG. 10, the polygon is an octagon, which includes a first side S1, a second side S2, a third side S3, a fourth side S4, a fifth side S5, a sixth side S6, a seventh side S7 and an eighth side S8 connected in sequence; an extending direction of the first side S1 is the same as that of the fifth side S5, and is perpendicular to that of the third side S3; in each radiation unit 100, an orthographic projection of the first feed line 11 on the first dielectric substrate 1 intersects with an orthographic projection of the second side S2 on the first dielectric substrate 1; an orthographic projection of the second feed line 12 on the first dielectric substrate 1 intersects with an orthographic projection of the fourth side S4 on the first dielectric substrate 1.

Further, in the embodiment of the present disclosure, when the second radiation part 61 is provided in each radiation unit 100, orthographic projections of centers of the second radiation part 61 and of the first radiation part 31 on the first dielectric substrate 1 may coincide with each other. An outline of the first radiation part 31 may be the same as or different from an outline of the second radiation part 61. In the embodiment of the present disclosure, as an example, the outline of the first radiation part 31 is an octagon, and the outline of the second radiation part 61 is a quadrangle (rectangle). Each of a length DI of the first radiation part 31 and a length of the second radiation part 61 are approximately equal to half of a waveguide wavelength at a center frequency.

Figure 11:
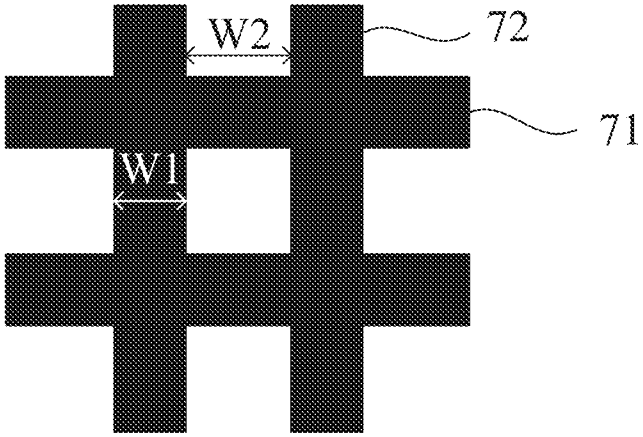
FIG. 11 is a schematic diagram of a part of a metal mesh structure according to an embodiment of the present disclosure.

In some examples, FIG. 11 is a partial schematic diagram of a metal mesh structure according to an embodiment of the present disclosure. As shown in FIG. 11, the antenna is a transparent antenna, and the first conductive layer 10, the second conductive layer 20, the third conductive layer 30, the fourth conductive layer 60, and the reflective layer 7 may all be of a metal mesh structure. That is, each first radiation part 31, each second radiation part 61, each first feed line 11, each second feed line 12, and the ground electrode layer (the second conductive layer 20) are all of a metal mesh structure. When the first conductive layer 10, the second conductive layer 20, the third conductive layer 30, the fourth conductive layer 60 and the reflective layer 7 all adopt a metal mesh structure, orthographic projections of hollow portions in the layers on the first dielectric substrate 1 overlap with each other, thereby ensuring the optical transmittance of the antenna.

For example: the metal mesh structure may include a plurality of first metal lines 71 and a plurality of second metal lines 72 crossing with the plurality of first metal lines 71. The plurality of first metal lines 71 are arranged side by side along a second direction and each first metal line 71 extends along a first direction; the plurality of second metal lines 72 are arranged side by side along the first direction and each second metal line 72 extends along a third direction. The light transmittance of the metal mesh structure is in a range from about 70% to 88%. In the embodiment of the present disclosure, extending directions of each first metal line 71 and each second metal line 72 of the metal mesh structure may be perpendicular to each other, thereby forming a square or a rectangular hollow portion. Alternatively, the extending directions of each first metal line 71 and each second metal line 72 of the metal mesh structure may be not perpendicular to each other. For example: an angle between the extending directions of each first metal line 71 and each second metal line 72 is 45°, thereby forming a diamond-shaped hollow portion. Line widths, line thicknesses, and line spacing of each first metal line 71 and each second metal line 72 of the metal mesh structure are preferably equal to each other, but may be different from each other. For example: each of the first metal lines 71 and the second metal lines 72 has a line width W1 in a range from about 1 μm to 30 μm, a line spacing W2 in a range from about 50 μm to 250 μm and a line thickness in a range from about 0.5 μm to 10 μm.

Further, when the first conductive layer 10, the second conductive layer 20, the third conductive layer 30 and the fourth conductive layer 60 all adopt a metal mesh structure, the first conductive layer 10 may be formed on a first base material, which is adhered to the first dielectric substrate 1 through a first adhesive layer, so that the first conductive layer 10 is disposed on the first dielectric substrate 1. Similarly, the second conductive layer 20 can be formed on a second base material, which is adhered to the second dielectric substrate 2 through a second adhesive layer, so that the second conductive layer 20 is disposed on the second dielectric substrate 2. The third conductive layer 30 may be formed on a third base material, which is adhered to the third dielectric substrate 3 through a third adhesive laver, so that the third conductive layer 30 is disposed on the third dielectric substrate 3. The fourth conductive layer 60 may be formed on a fourth base material, which is adhered to the sixth dielectric substrate 6 through a fourth adhesive layer, so that the fourth conductive layer 60 is disposed on the sixth dielectric substrate 6. The reflective layer 7 is formed on a fifth base material, which is adhered to the first dielectric substrate 1 through a fifth adhesive layer.

Materials of the first base material, the second base material, the third base material, the fourth base material and the fifth base material may be the same, and may include, but be not limited to, polyethylene terephthalate (PET), polyimide (PI), o the like. A thickness of each of the first base material, the second base material, the third base material and the fourth base material is in a range from about 50 μm to 250 μm.

Materials of the first dielectric substrate 1, the second dielectric substrate 2, the third dielectric substrate 3 and the sixth dielectric substrate 6 include, but are not limited to, transparent hard materials, such as: plastics, which specifically include, but are not limited to, polycarbonate (PC), copolymers of cycloolefin (COP), or polymethyl methacrylate (PMMA), or the like.

Materials of the first adhesive layer, the second adhesive layer, the third adhesive layer, the fourth adhesive layer and the fifth adhesive layer include, but are not limited to, optically clear adhesive (OCA).

Materials of the first conductive layer 10, the second conductive layer 20, the third conductive layer 30, the fourth conductive layer 60, and the reflective layer 7 include, but are not limited to, metal materials such as copper, silver, or aluminum, which are not limited in the embodiments of the present disclosure.

Figure 12:
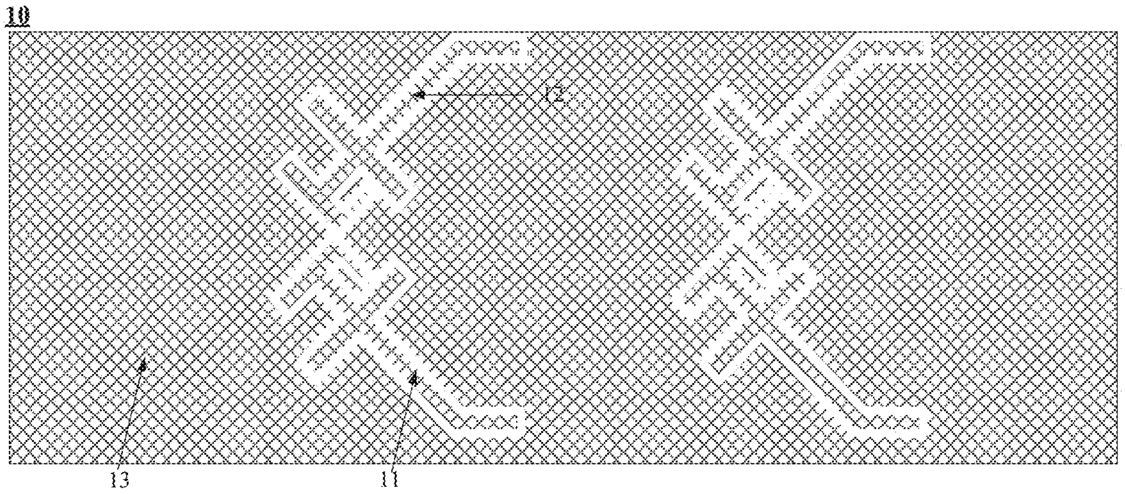
FIG. 12 is a top view of a first conductive layer according to an embodiment of the present disclosure.

In some examples, FIG. 12 is a top view of a first conductive layer 10 according to an embodiment of the present disclosure. As shown in FIG. 12, the first conductive layer 10 includes not only the at least one first feed line 11 and the at least one second feed line 12, but also a first redundant electrode 13, which is filled in a position on the first dielectric substrate 1 except for the at least one first feed line 11 and the at least one second feed line 12, so that the first conductive layer 10 has a whole planar structure, but the first redundant electrode 13 is disconnected from the at least one first feed line 11 and the at least one second feed line 12 at the junction thereof. In this case, the at least one first feed line 11 and the at least one second feed line 12 and the first redundant electrode 13 may be formed through one patterning process, and may be formed by forming a whole layer of first and second metal lines crossing with each other, and then performing a chopping process on the first and second metal lines. In some examples, a width of a position, where each of the first metal lines and the second metal lines in the first radiation layer is broken, is in a range from about 1 μm to 30 μm, but may be specifically defined according to the radiation requirement of the antenna.

Figure 13:
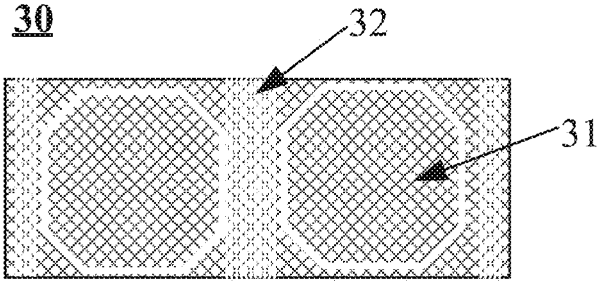
FIG. 13 is a top view of a third conductive layer according to an embodiment of the present disclosure.

Similarly, FIG. 13 is a top view of a third conductive layer 30 according to an embodiment of the present disclosure. As shown in FIG. 13, the third conductive layer 30 not only includes the first radiation parts 31, but also includes a second redundant electrode 32, which is filled in a position on the third dielectric substrate except for the first radiation parts 31, and the second redundant electrode 32 is disconnected from the first radiation parts 31. The third conductive layer 30 including the first radiation parts 31 and the second redundant electrode 32 can also be formed in the same way of forming the first conductive layer 10.

Figure 14:
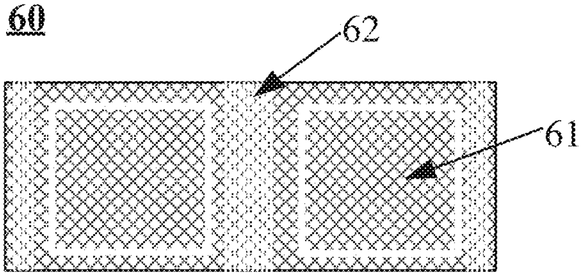
FIG. 14 is a top view of a fourth conductive layer according to an embodiment of the present disclosure.

Similarly, FIG. 14 is a top view of a fourth conductive layer 60 according to an embodiment of the present disclosure. As shown in FIG. 14, the fourth conductive layer 60 not only includes the second radiation parts 61, but also includes a third redundant electrode 42, which is filled in a position on the sixth dielectric substrate except for the second radiation parts 61, and the third redundant electrode 42 is disconnected from the second radiation parts 61. The fourth conductive layer 60 including the second radiation parts 61 and the third redundant electrode 42 can also be formed in the same way of forming the first conductive layer 10.

The first conductive layer 10, the third conductive layer 30 and the fourth conductive layer 60 have a whole planar structure, so as to ensure that the optical transmittance of the antenna is uniform.

In order to clearly understand the effect of the radiation units 100 and the antenna of the embodiment of the present disclosure, the description is made with reference to the specific simulation result. Each radiation unit 100 is the radiation unit 100 shown in FIG. 3 as an example; the antenna is the antenna shown in FIG. 1 as an example. The antenna includes two radiation units 100, the first conductive layer 10, the second conductive layer 20, the third conductive layer 30, the fourth conductive layer 60, and the reflective layer 7 all adopt the metal mesh structure; the first feed structure 41 and the second feed structure 51 are both made of solid copper. A spacing between the any adjacent two radiation units 100 is 0.5% (i.e., one-half of a free space wavelength at a lowest frequency).

Figure 15A:
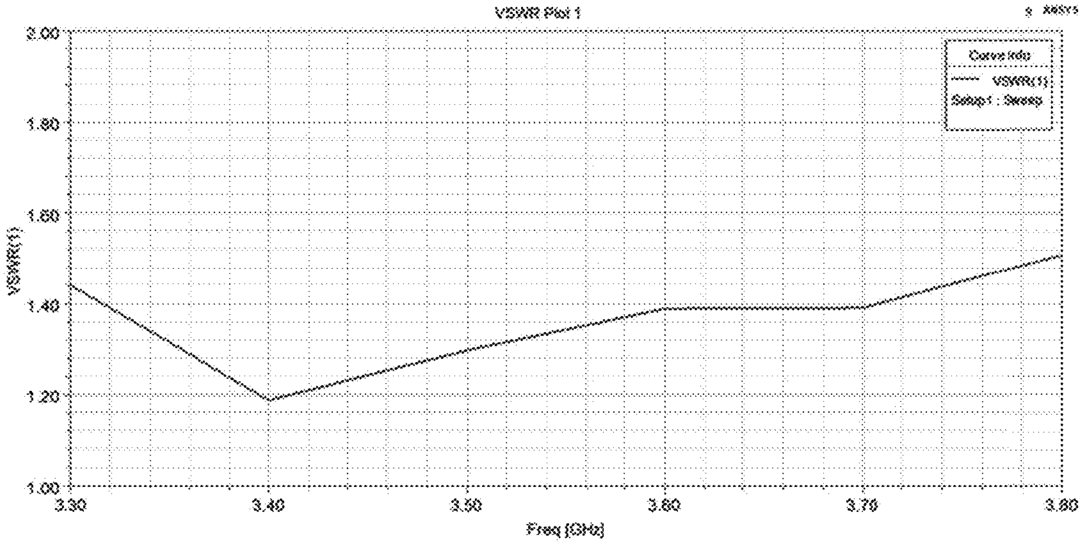
FIG. 15*a* is a graph showing standing wave characteristics of the radiation unit shown in FIG. 3.
Figure 15B:
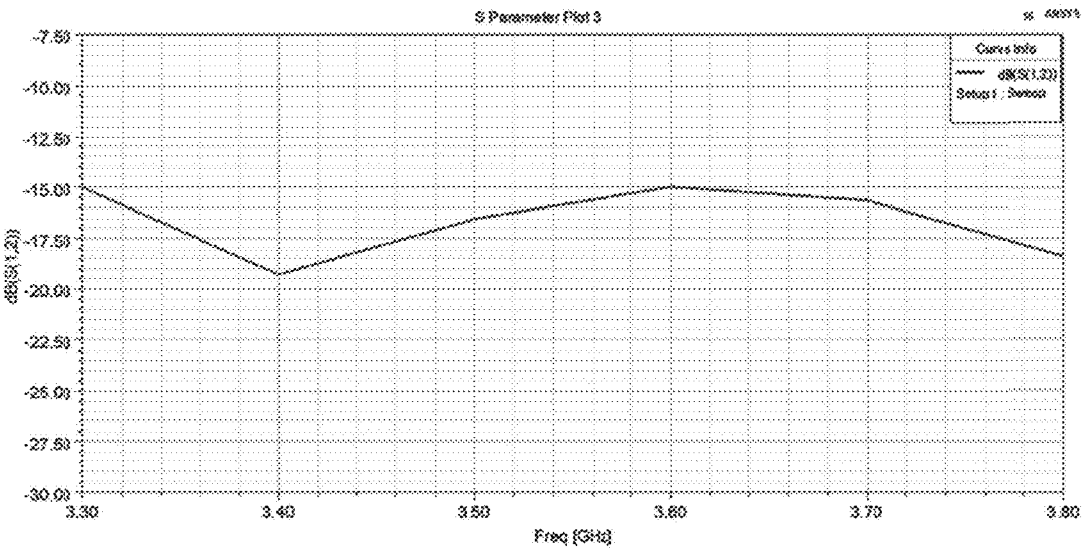
FIG. 15*b* is a graph showing isolation characteristics of the radiation unit shown in FIG. 3.

FIG. 15*a* is a graph showing standing wave characteristics of the radiation unit 100 shown in FIG. 3. FIG. 15*b* is a graph showing isolation characteristics of the radiation unit 100 shown in FIG. 3. As shown in FIGS. 15*a* and 15*b*, each radiation unit 100 of the embodiment of the present disclosure has a broadband. With VSWR (voltage standing wave ratio) lower than 1.5, a bandwidth of the antenna is in a range from 3.3 GHz to 3.8 GHz, the relative bandwidth is 14%, the isolation is higher than 15 dB, and the antenna has a certain broadband, thereby ensuring a wider application scenario of the antenna of the embodiment of the present disclosure.

Figure 16:
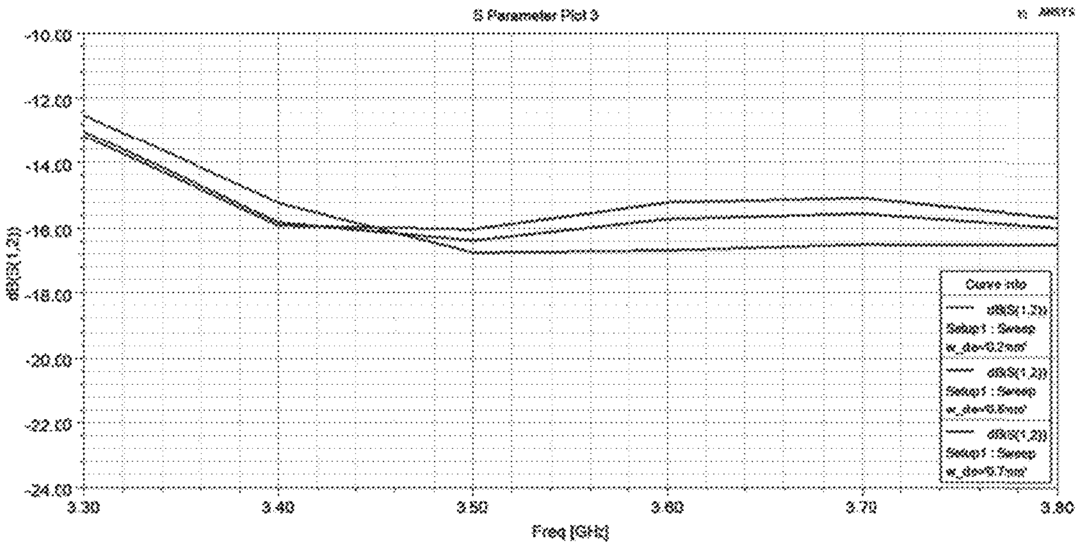
FIG. 16 is a graph showing an isolation varying with a width of a third opening of the radiation unit shown in FIG. 3.

FIG. 16 is a graph showing a variation in an isolation of the radiation unit 100 as shown in FIG. 3 with a width of a third opening 23. As shown in FIG. 16, the port isolation of the antenna increases as a width of each third opening 23 increases.

Figure 17:
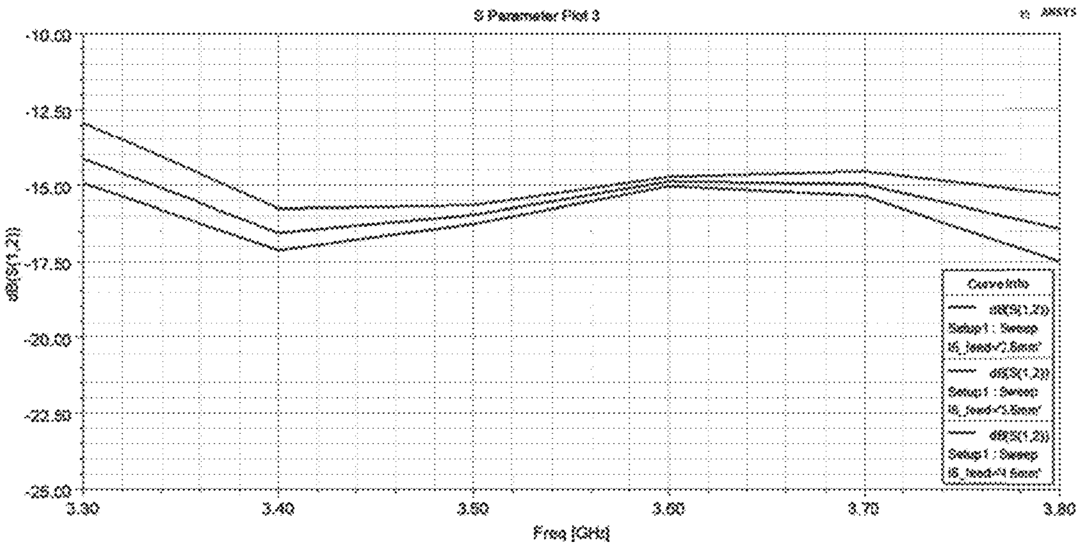
FIG. 17 is a graph showing an isolation varying with a length of each of a first branch and a second branch of the radiation unit shown in FIG. 3.

FIG. 17 is a graph showing a variation in an isolation of the radiation unit 100 as shown in FIG. 3 with a length of each of a first branch 113 and a second branch 123. As shown in FIG. 17, the port isolation of the antenna increases as a length of each of each first branch 113 and each second branch 123 increases.

Figure 18A:
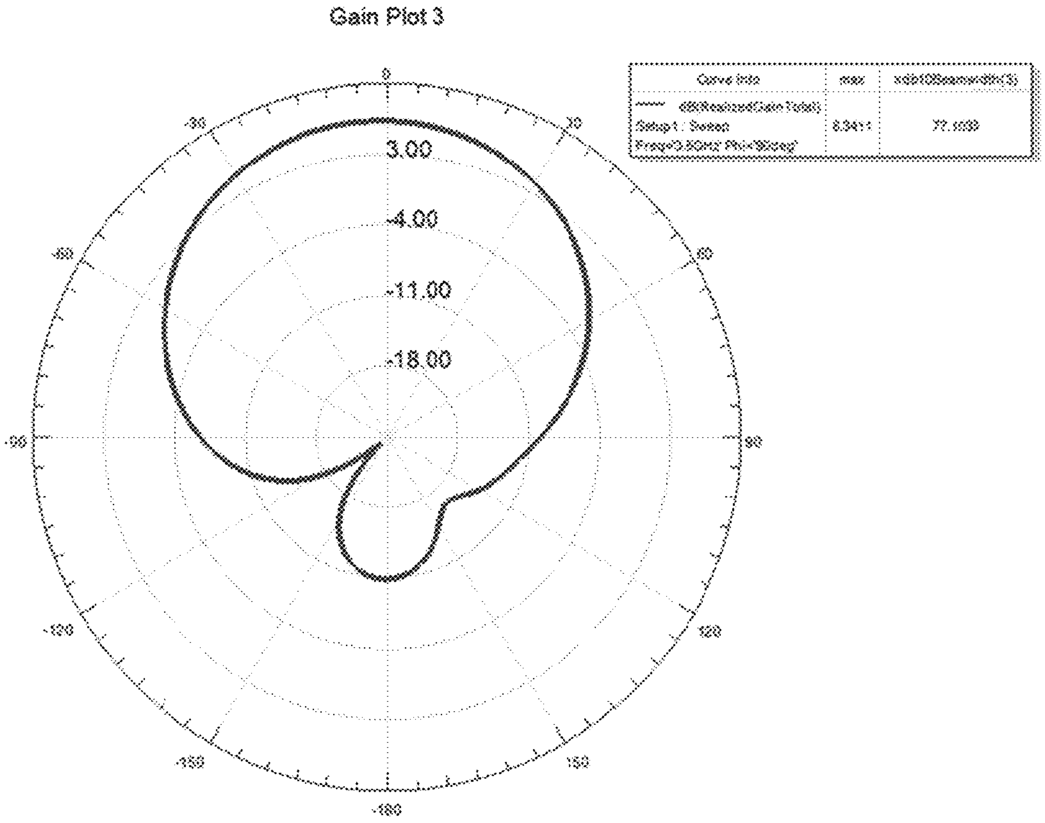
FIG. 18*a* is a schematic diagram of a vertical radiation pattern of the radiation unit as shown in FIG. 3 at a center frequency.
Figure 18B:
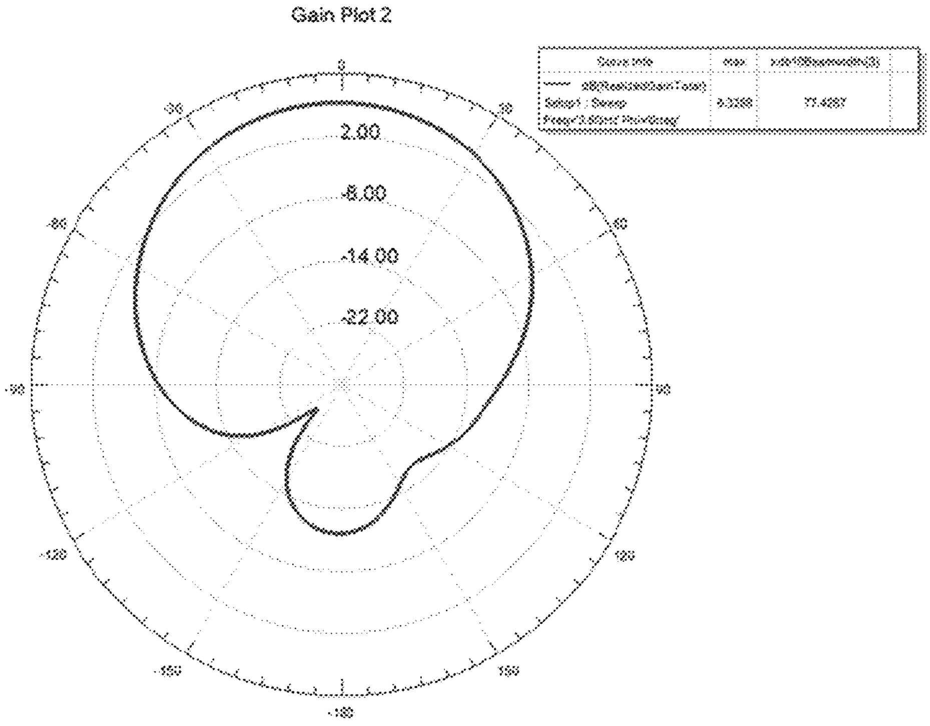
FIG. 18*b* is a schematic diagram of a horizontal radiation pattern of the radiation unit as shown in FIG. 3 at a center frequency.

FIG. 18*a* is a schematic diagram of a vertical pattern of the radiation unit as shown in FIG. 3 at a center frequency. FIG. 18*b* is a schematic diagram of a horizontal pattern of the radiation unit as shown in FIG. 3 at a center frequency. As shown in FIGS. 18*a* and 18*b*, the antenna of the embodiment of the present disclosure has a radiation gain higher than 6.3 at a center frequency, and a horizontal plane 3 dB beam width of 77° and a vertical plane 3 dB beam width of 77°.

Figure 19A:
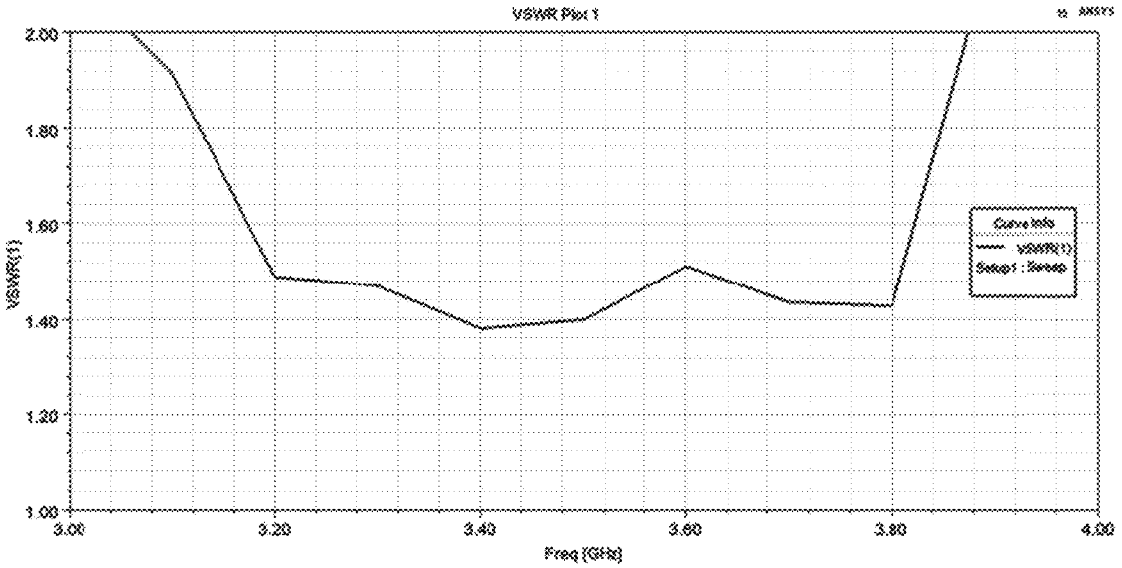
FIG. 19*a* is a graph showing standing wave characteristics of the antenna shown in FIG. 1.
Figure 19B:
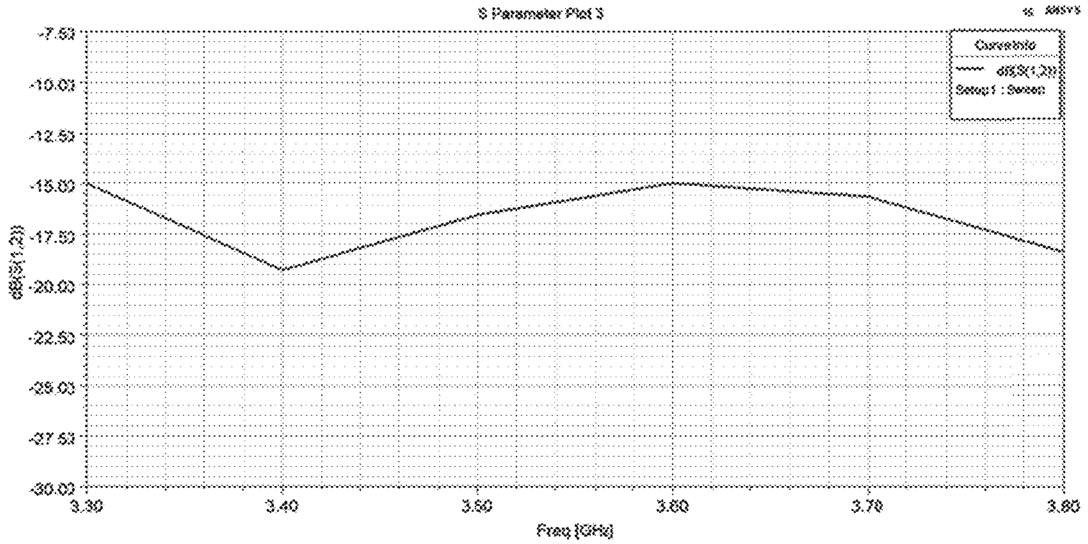
FIG. 19*b* is a graph showing isolation characteristics of the antenna shown in FIG. 1.

FIG. 19*a* is a graph showing standing wave characteristics of the antenna shown in FIG. 1. FIG. 19*b* is a graph showing isolation characteristics of the antenna shown in FIG. 1. As shown in FIGS. 19*a* and 19*b*, with the VSWR lower than 1.5, a bandwidth of the antenna is in a range from 3.3 GHz to 3.8 GHz, the relative bandwidth is 14%, the port isolation is higher than 15 dB.

Figure 20A:
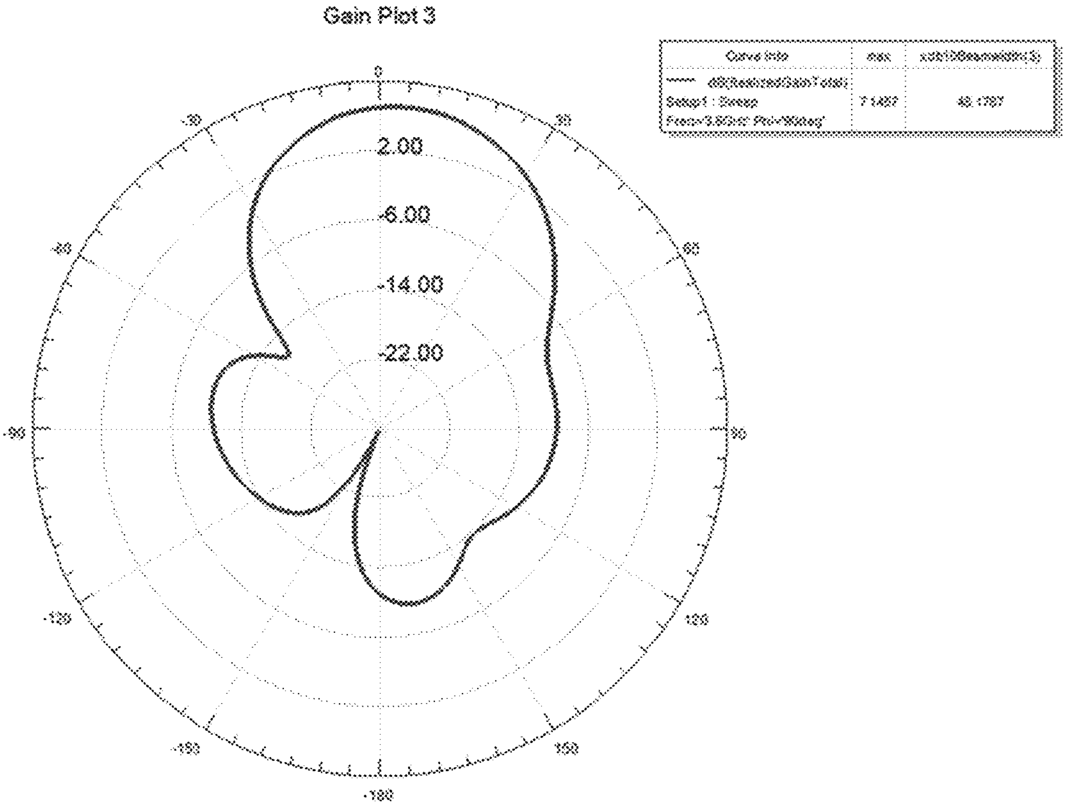
FIG. 20*a* is a schematic diagram of a vertical radiation pattern of the antenna shown in FIG. 1 at a center frequency.
Figure 20B:
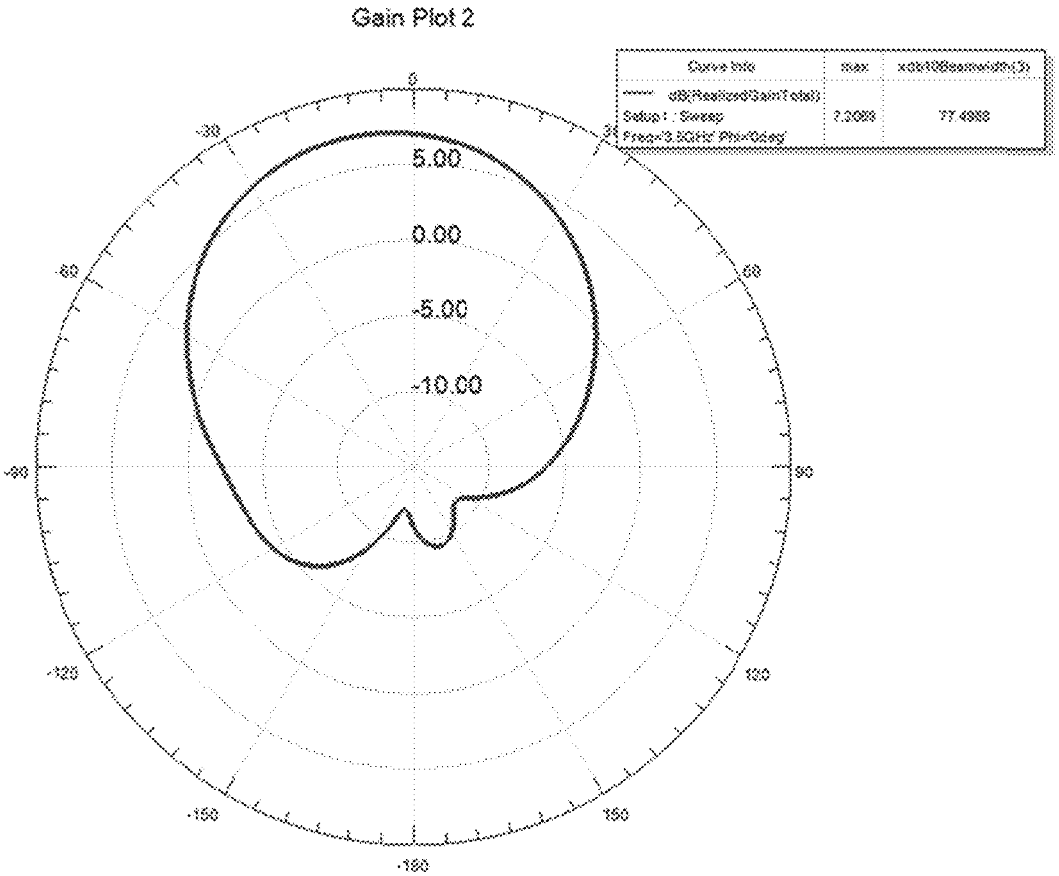
FIG. 20*b* is a schematic diagram of a horizontal radiation pattern of the antenna shown in FIG. 1 at a center frequency.

FIG. 20*a* is a schematic diagram of a vertical pattern of the antenna shown in FIG. 1 at a center frequency. FIG. 20*b* is a schematic diagram of a horizontal pattern of the antenna shown in FIG. 1 at a center frequency. As shown in FIGS. 20*a* and 20*b*, the antenna of the embodiment of the present disclosure has a radiation gain higher than 7.1 at a center frequency, and a horizontal plane 3 dB beam width of 77° and a vertical plane 3 dB beam width of 45°.

Figure 21:
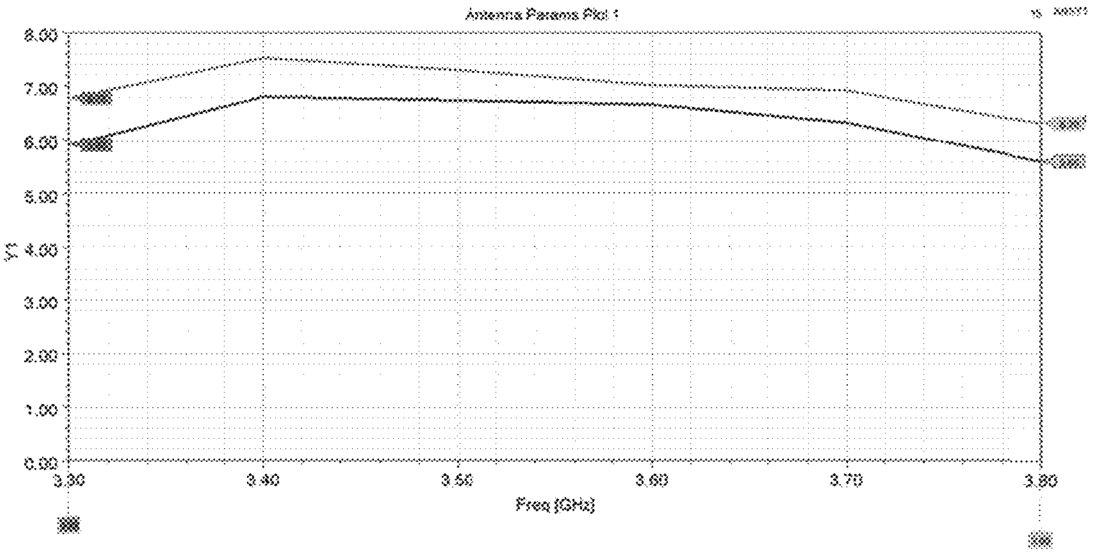
FIG. 21 is a graph showing a comparison between gains for the antennas shown in FIG. 1 with a first feed structure/a second feed structure adopting a solid copper and a metal mesh structure.

FIG. 21 is a graph showing a comparison between gains for the antennas shown in FIG. 1 with a first feed structure 41/a second feed structure 51 adopting a solid copper and a metal mesh structure. As shown in FIG. 21, the antenna gain of the first feed structure 41 and the second feed structure 51 adopting the solid copper is significantly better than that of the first feed structure 41 and the second feed structure 51 adopting the metal mesh structure.

In a second aspect, the embodiment of the present disclosure provides an electronic device that may include the above antenna.

The electronic device in the embodiment of the present disclosure may be used in a glass window system for an automobile, a train (including a high-speed rail), an aircraft, a building, or the like. The antenna may be fixed inside of the glass window (a side closer to a room). Because the optical transmittance of the antenna is high, the transmittance of the glass window is not greatly affected while realizing the communication function of the antenna, and such the antenna becomes a development trend for an aesthetic antenna. The glass window in the embodiments of the present disclosure includes, but is not limited to, double glass, single glass, laminated glass, thin glass, thick glass, or the like.

In some examples, the electronic device provided by embodiments of the present disclosure further includes a transceiver unit, a radio frequency transceiver, a signal amplifier, a power amplifier, and a filtering unit. The antenna in a communication system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the communication system and is processed by the filtering unit, the power amplifier, the signal amplifier, and the radio frequency transceiver, the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the communication system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the communication system provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a first dielectric substrate, a first conductive layer, a second dielectric substrate, a second conductive layer, a third dielectric substrate and a third conductive layer which are sequentially stacked;

wherein the first conductive layer comprises at least one first feed line and at least one second feed line;

the second conductive layer is provided with at least one first opening and at least one second opening therein; and the third conductive layer comprises at least one first radiation part;

wherein orthographic projections of any two of the first opening, the first feed line, the first radiation part corresponding to each other on the first dielectric substrate overlap with each other; and orthographic projections of any two of the second opening, the second feed line, the first radiation part corresponding to each other on the first dielectric substrate overlap with each other; and an outline of an orthographic projection of the first radiation part on the first dielectric substrate intersects with an orthographic projection of each of the corresponding first feed line and the corresponding second feed line on the first dielectric substrate, and the orthographic projection of each of the first feed line and the second feed line on the first dielectric substrate extends into the orthographic projection of the first radiation part on the first dielectric substrate; and the at least one first feed line and the at least one second feed line have different extending directions;

wherein the first feed line comprises a first feed line sub-segment and a second feed line sub-segment connected in a T shape;

the second feed line comprises a third feed line sub-segment and a fourth feed line sub-segment connected in a T shape; and wherein the first feed line further comprises a first branch;

the second feed line also comprises a second branch;

the first branch is connected to one end of a corresponding first feed line sub-segment;

an extending direction of the first branch intersects with an extending direction of the first feed line sub-segment;

an extending direction of the second branch intersects with an extending direction of a corresponding third feed line sub-segment; and orthographic projections of the first branch and the second branch on the first dielectric substrate are both covered by the orthographic projection of a corresponding first radiation part on the first dielectric substrate.

2. The antenna of claim 1, wherein each of the at least one first opening and the at least one second opening has two types of slits orthogonal to each other.

3. The antenna of claim 2, wherein each of the at least one first opening and the at least one second opening comprises an H-shaped opening.

4. The antenna of claim 1, wherein the antenna comprises at least one radiation unit, each of which comprises one first radiation part, one first feed line, and one second feed line; and each of the first feed line sub-segment and the third feed line sub-segment comprises a first end and a second end opposite to each other; and in one radiation unit, the first end of the first feed line sub-segment is adjacent to the first end of the third feed line sub-segment; the first branch is connected to the first end of the first feed line sub-segment; and the second branch is connected to the first end of the third feed line sub-segment.

5. The antenna of claim 4, wherein in one radiation unit, an extension line of the second feed line sub-segment and an extension line of the fourth feed line sub-segment intersect with each other to form a first angle, which is bisected by a first dividing line; and the first feed line and the second feed line are arranged in mirror symmetry with respect to an extension line of the first dividing line as a symmetry axis.

6. The antenna of claim 1, wherein the antenna comprises at least one radiation unit, each radiation unit comprises one first radiation part, one first feed line, and one second feed line; and the second conductive layer further comprises at least one third opening; and an orthographic projection of one third opening on the first dielectric substrate is between orthographic projections of a first feed line and a second feed line of a corresponding radiation unit on the first dielectric substrate, and at least partially overlaps with an orthographic projection of the first radiation part on the first dielectric substrate.

7. An antenna, comprising a first dielectric substrate, a first conductive layer, a second dielectric substrate, a second conductive layer, a third dielectric substrate and a third conductive layer which are sequentially stacked;

wherein the first conductive layer comprises at least one first feed line and at least one second feed line;

the second conductive layer is provided with at least one first opening and at least one second opening therein; and the third conductive layer comprises at least one first radiation part;

wherein orthographic projections of any two of the first opening, the first feed line, the first radiation part corresponding to each other on the first dielectric substrate overlap with each other; and orthographic projections of any two of the second opening, the second feed line, the first radiation part corresponding to each other on the first dielectric substrate overlap with each other; and an outline of an orthographic projection of the first radiation part on the first dielectric substrate intersects with an orthographic projection of each of the corresponding first feed line and the corresponding second feed line on the first dielectric substrate, and the orthographic projection of each of the first feed line and the second feed line on the first dielectric substrate extends into the orthographic projection of the first radiation part on the first dielectric substrate; and the at least one first feed line and the at least one second feed line have different extending directions, wherein the first dielectric substrate comprises a first side and a second side opposite to each other;

the antenna further comprises a first feed substrate and a second feed substrate;

the first feed substrate comprises a fourth dielectric substrate, a first feed structure and a first reference electrode layer;

the fourth dielectric substrate is opposite to the first side;

the first feed structure is on a side of the fourth dielectric substrate facing towards the first side, and is electrically connected to the at least one first feed line; and the first reference electrode layer is on a side of the fourth dielectric substrate away from the first feed structure; and the second feed substrate comprises a fifth dielectric substrate, a second feed structure and a second reference electrode layer;

the fifth dielectric substrate is opposite to the second side;

the second feed structure is on a side of the fifth dielectric substrate facing towards the second side and is electrically connected to the at least one second feed line; and the second reference electrode layer is on a side of the fifth dielectric substrate away from the second feed structure.

8. The antenna of claim 1, further comprising a reflective layer on a side of the first dielectric substrate away from the first conductive layer.

9. The antenna of claim 8, wherein the reflective layer comprises a metal mesh structure.

10. The antenna of claim 1, further comprising a sixth dielectric substrate, and at least one second radiation part on the sixth dielectric substrate;

wherein an orthographic projection of a second radiation part on the first dielectric substrate at least partially overlaps with an orthographic projection of a corresponding first radiation part on the first dielectric substrate; and a certain distance exists between a layer where the first radiation part is located and a layer where the second radiation part is located.

11. The antenna of claim 1, wherein each first radiation part comprises a polygon, and any one of interior angles of the polygon is greater than 90°.

12. The antenna of claim 11, wherein the polygon comprises a first side, a second side, a third side, a fourth side, a fifth side, a sixth side, a seventh side, and an eighth side connected in sequence;

an extending direction of the first side is the same as that of the fifth side and perpendicular to that of the third side;

orthographic projections of the first feed line and the second side corresponding to each other on the first dielectric substrate intersect with each other; and orthographic projections of the second feed line and the fourth side corresponding to each other on the first dielectric substrate intersect with each other.

13. The antenna of claim 1, wherein at least one of the first conductive layer, the second conductive layer, and the third conductive layer comprises a metal mesh structure.

14. An electronic device, comprising an antenna, which comprises a first dielectric substrate, a first conductive layer, a second dielectric substrate, a second conductive layer, a third dielectric substrate and a third conductive layer which are sequentially stacked;

wherein the first conductive layer comprises at least one first feed line and at least one second feed line;

the second conductive layer is provided with at least one first opening and at least one second opening therein; and the third conductive layer comprises at least one first radiation part;

wherein orthographic projections of any two of a first opening, a first feed line, a first radiation part corresponding to each other on the first dielectric substrate overlap with each other; and orthographic projections of any two of a second opening, a second feed line, a first radiation part corresponding to each other on the first dielectric substrate overlap with each other; and an outline of an orthographic projection of a first radiation part on the first dielectric substrate intersects with an orthographic projection of each of a corresponding first feed line and a corresponding second feed line on the first dielectric substrate, and the orthographic projection of each of the first feed line and the second feed line on the first dielectric substrate extends into the orthographic projection of the first radiation part on the first dielectric substrate; and the at least one first feed line and the at least one second feed line have different extending directions, wherein the first feed line comprises a first feed line sub-segment and a second feed line sub-segment connected in a T shape; and the second feed line comprises a third feed line sub-segment and a fourth feed line sub-segment connected in a T shape, and wherein the first feed line further comprises a first branch;

the second feed line also comprises a second branch;

the first branch is connected to one end of a corresponding first feed line sub-segment;

an extending direction of the first branch intersects with an extending direction of the first feed line sub-segment;

an extending direction of the second branch intersects with an extending direction of a corresponding third feed line sub-segment; and orthographic projections of the first branch and the second branch on the first dielectric substrate are both covered by the orthographic projection of a corresponding first radiation part on the first dielectric substrate.

15. The electronic device of claim 14, wherein each of the at least one first opening and the at least one second opening has two types of slits orthogonal to each other.

16. The electronic device of claim 15, wherein each of the at least one first opening and the at least one second opening comprises an H-shaped opening.

* * * * *